(12) United States Patent
Ekonen et al.

(10) Patent No.: US 7,111,716 B2
(45) Date of Patent: Sep. 26, 2006

(54) POWER-OPERATED CLUTCH ACTUATOR FOR TORQUE TRANSFER MECHANISMS

(75) Inventors: Todd Ekonen, Howell, MI (US); Douglas Bradley, Sterling Heights, MI (US)

(73) Assignee: Magna Powertrain USA, Inc., Troy, MI (US)

( * ) Notice: Subject to any disclaimer, the term of this patent is extended or adjusted under 35 U.S.C. 154(b) by 0 days.

(21) Appl. No.: 11/287,708

(22) Filed: Nov. 28, 2005

(65) Prior Publication Data

US 2006/0163018 A1    Jul. 27, 2006

Related U.S. Application Data

(60) Provisional application No. 60/647,331, filed on Jan. 26, 2005.

(51) Int. Cl.
*F16D 21/04* (2006.01)
*F16D 27/00* (2006.01)

(52) U.S. Cl. .............. 192/20; 180/249; 192/84.6; 192/93 A; 475/150

(58) Field of Classification Search ............... None
See application file for complete search history.

(56) References Cited

U.S. PATENT DOCUMENTS

| | | |
|---|---|---|
| 4,805,486 A | 2/1989 | Hagiwara et al. |
| 4,862,769 A | 9/1989 | Koga et al. |
| 4,895,236 A | 1/1990 | Sakakibara et al. |
| 4,950,214 A * | 8/1990 | Botterill ............ 475/231 |
| 4,976,347 A | 12/1990 | Sakakibara et al. |
| 5,007,886 A | 4/1991 | Holmquist et al. |
| 5,024,638 A * | 6/1991 | Sakakibara et al. ...... 475/210 |
| 5,119,298 A | 6/1992 | Naito |
| 5,224,906 A | 7/1993 | Sturm |
| 5,323,871 A | 6/1994 | Wilson et al. |
| 5,407,024 A | 4/1995 | Watson et al. |
| 5,423,235 A | 6/1995 | Botterill et al. |
| 5,462,496 A * | 10/1995 | Dick et al. ............ 475/204 |
| 5,503,602 A * | 4/1996 | Dick ..................... 475/204 |
| 6,158,561 A | 12/2000 | Sakai et al. |
| 6,283,887 B1 | 9/2001 | Brown et al. |
| 6,398,686 B1 | 6/2002 | Irwin |
| 6,478,708 B1 | 11/2002 | Krisher |
| 6,484,857 B1 | 11/2002 | Vonnegut et al. |
| 6,520,880 B1 | 2/2003 | Fukushima et al. |
| 6,595,338 B1 | 7/2003 | Bansbach et al. |
| 6,641,267 B1 | 11/2003 | Ohishi et al. |
| 6,645,109 B1 | 11/2003 | Williams et al. |
| 6,651,793 B1 | 11/2003 | Reisinger |
| 6,659,250 B1 | 12/2003 | Nestler et al. |
| 6,676,555 B1 | 1/2004 | Duan |
| 6,691,845 B1 | 2/2004 | Showalter |
| 6,766,889 B1 | 7/2004 | Pennycuff |
| 6,808,037 B1 | 10/2004 | Mueller |

(Continued)

FOREIGN PATENT DOCUMENTS

DE          3908478 A1     5/1989

(Continued)

*Primary Examiner*—Saul Rodriguez
(74) *Attorney, Agent, or Firm*—Harness, Dickey & Pierce, P.L.C.

(57) ABSTRACT

A torque transfer mechanism is provided for controlling the magnitude of a clutch engagement force exerted on a multi-plate clutch assembly that is operably disposed between a first rotary and a second rotary member. The torque transfer mechanism includes a power-operated face gear clutch actuator for generating and applying a clutch engagement force on the clutch assembly.

25 Claims, 10 Drawing Sheets

U.S. PATENT DOCUMENTS

| | | |
|---|---|---|
| 6,808,052 B1 | 10/2004 | Kirkwood et al. |
| 6,951,521 B1 | 10/2005 | Hakui |
| 6,951,522 B1 * | 10/2005 | Baxter et al. ............... 475/205 |
| 6,988,604 B1 | 1/2006 | Kelley, Jr. |

FOREIGN PATENT DOCUMENTS

| | | |
|---|---|---|
| JP | 62-18117 | 1/1990 |
| JP | 63-66927 | 3/1990 |

* cited by examiner

POWER-OPERATED CLUTCH ACTUATOR FOR TORQUE TRANSFER MECHANISMS

CROSS-REFERENCE TO RELATED APPLICATIONS

This application claims the benefit of U.S. Provisional Application No. 60/647,331, filed on Jan. 26, 2005. The disclosure of the above application is incorporated herein by reference.

FIELD OF THE INVENTION

The present invention relates generally to power transfer systems for controlling the distribution of drive torque between the front and rear drivelines of a four-wheel drive vehicle and/or the left and right wheel of an axle assembly. More particularly, the present invention is directed to a power transmission device for use in motor vehicle driveline applications having a torque transfer mechanism equipped with a power-operated clutch actuator that is operable for controlling actuation of a multi-plate friction clutch assembly.

BACKGROUND OF THE INVENTION

In view of increased demand for four-wheel drive vehicles, a plethora of power transfer systems are currently being developed for incorporation into vehicular driveline applications for transferring drive torque to the wheels. In many vehicles, a power transmission device is operably installed between the primary and secondary drivelines. Such power transmission devices are typically equipped with a torque transfer mechanism which is operable for selectively and/or automatically transferring drive torque from the primary driveline to the secondary driveline to establish a four-wheel drive mode of operation.

A modern trend in four-wheel drive motor vehicles is to equip the power transmission device with a transfer clutch and an electronically-controlled traction control system. The transfer clutch is operable for automatically directing drive torque to the secondary wheels, without any input or action on the part of the vehicle operator, when traction is lost at the primary wheels for establishing an "on-demand" four-wheel drive mode. Typically, the transfer clutch includes a multi-plate clutch assembly that is installed between the primary and secondary drivelines and a clutch actuator for generating a clutch engagement force that is applied to the clutch plate assembly. The clutch actuator typically includes a power-operated device that is actuated in response to electric control signals sent from an electronic controller unit (ECU). Variable control of the electric control signal is frequently based on changes in the current operating characteristics of the vehicle (i.e., vehicle speed, interaxle speed difference, acceleration, steering angle, etc.) as detected by various sensors. Thus, such "on-demand" power transmission devices can utilize adaptive control schemes for automatically controlling torque distribution during all types of driving and road conditions.

A large number of on-demand power transmission have been developed which utilize an electrically-controlled clutch actuator for regulating the amount of drive torque transferred through the clutch assembly to the secondary driveline as a function of the value of the electrical control signal applied thereto. In some applications, the transfer clutch employs an electromagnetic clutch as the power-operated clutch actuator. For example, U.S. Pat. No. 5,407,024 discloses a electromagnetic coil that is incrementally activated to control movement of a ball-ramp drive assembly for applying a clutch engagement force on the multi-plate clutch assembly. Likewise, Japanese Laid-open Patent Application No. 62-18117 discloses a transfer clutch equipped with an electromagnetic clutch actuator for directly controlling actuation of the multi-plate clutch pack assembly.

As an alternative, the transfer clutch may employ an electric motor and a drive assembly as the power-operated clutch actuator. For example, U.S. Pat. No. 5,323,871 discloses an on-demand transfer case having a transfer clutch equipped with an electric motor that controls rotation of a sector plate which, in turn, controls pivotal movement of a lever arm for applying the clutch engagement force to the multi-plate clutch assembly. Moreover, Japanese Laid-open Patent Application No. 63-66927 discloses a transfer clutch which uses an electric motor to rotate one cam plate of a ball-ramp operator for engaging the multi-plate clutch assembly. Finally, U.S. Pat. Nos. 4,895,236 and 5,423,235 respectively disclose a transfer case equipped with a transfer clutch having an electric motor driving a reduction gearset for controlling movement of a ball screw operator and a ball-ramp operator which, in turn, apply the clutch engagement force to the clutch pack.

While many on-demand clutch control systems similar to those described above are currently used in four-wheel drive vehicles, a need exists to advance the technology and address recognized system limitations. For example, the size and weight of the friction clutch components and the electrical power and actuation time requirements for the clutch actuator that are needed to provide the large clutch engagement loads may make such system cost prohibitive in some motor vehicle applications. In an effort to address these concerns, new technologies are being considered for use in power-operated clutch actuator applications.

SUMMARY OF THE INVENTION

Thus, its is an object of the present invention to provide a power transmission device for use in a motor vehicle having a torque transfer mechanism equipped with a power-operated clutch actuator that is operable to control engagement of a multi-plate clutch assembly.

As a related object, the torque transfer mechanism of the present invention is well-suited for use in motor vehicle driveline applications to control the transfer of drive torque between a first rotary member and a second rotary member.

According to one preferred embodiment, a transfer unit is provided for use in a four-wheel drive motor vehicle having a powertrain and first and second drivelines. The transfer unit includes a first shaft driven by the powertrain, a second shaft adapted for connection to the second driveline and a torque transfer mechanism, The torque transfer mechanism includes a friction clutch assembly operably disposed between the first shaft and the second shaft and a clutch actuator assembly for generating and applying a clutch engagement force to the friction clutch assembly. The clutch actuator assembly includes an electric motor, a geared drive unit and a clutch apply operator. The electric motor drives the geared drive unit which, in turn, controls the direction and amount of relative rotation between a pair of cam members associated with the clutch apply operator. The cam members support rollers which ride against tapered or ramped cam surfaces. The contour of the ramped cam surfaces cause one of the cam members to move axially for causing corresponding translation of a thrust member. The thrust member applies the thrust force generated by the cam members as a clutch engagement force that is exerted on the friction clutch assembly. A control system including vehicle sensors and a controller are provided to control actuation of the electric motor.

In accordance with the present invention, the transfer unit is configured as an in-line torque coupling for use in adaptively controlling the transfer of drive torque from the powertrain to the rear drive axle of an all-wheel drive vehicle. Pursuant to related embodiments, the transfer unit is a transfer case for use in adaptively controlling the transfer of drive torque to the front driveline in an on-demand four-wheel drive vehicle or between the front and rear drivelines in a full-time four-wheel drive vehicle.

BRIEF DESCRIPTION OF THE DRAWINGS

Further objects, features and advantages of the present invention will become apparent to those skilled in the art from analysis of the following written description, the appended claims, and accompanying drawings in which:

DETAILED DESCRIPTION OF THE PREFERRED EMBODIMENTS

The present invention is directed to a torque transfer mechanism that can be adaptively controlled for modulating the torque transferred between a first rotary member and a second rotary member. The torque transfer mechanism finds particular application in power transmission devices for use in motor vehicle drivelines such as, for example, an on-demand transfer clutch in a transfer case or an in-line torque coupling or a biasing clutch associated with a differential unit in a transfer case or a drive axle assembly. Thus, while the present invention is hereinafter described in association with particular arrangements for use in specific driveline applications, it will be understood that the arrangements shown and described are merely intended to illustrate embodiments of the present invention.

Figure 1:
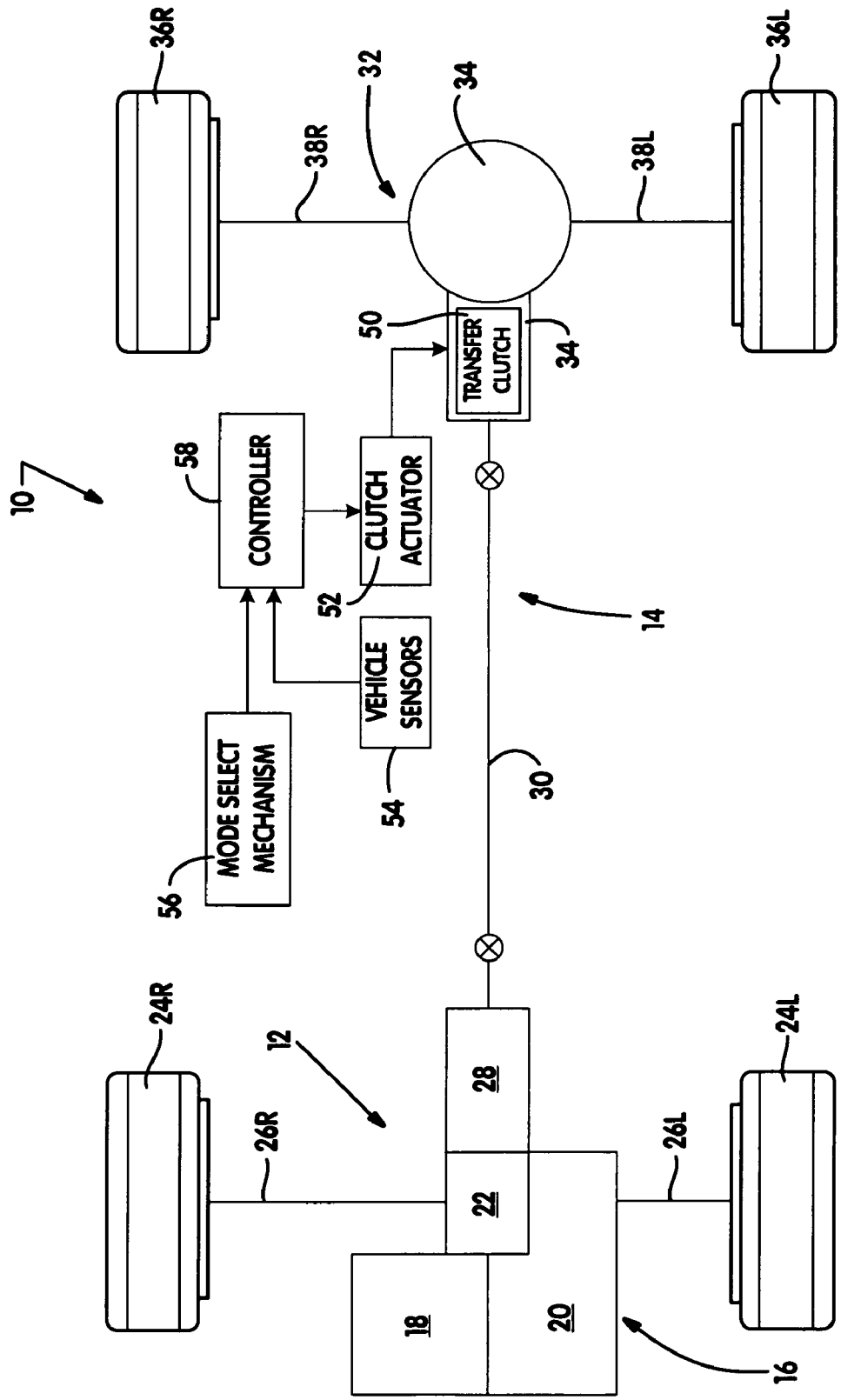
FIG. 1 illustrates the drivetrain of an all-wheel drive motor vehicle equipped with a power transmission device of the present invention.

With particular reference to FIG. 1 of the drawings, a drivetrain 10 for an all-wheel drive vehicle is shown. Drivetrain 10 includes a primary driveline 12, a secondary driveline 14, and a powertrain 16 for delivering rotary tractive power (i.e., drive torque) to the drivelines. In the particular arrangement shown, primary driveline 12 is the front driveline while secondary driveline 14 is the rear driveline. Powertrain 16 is shown to include an engine 18 and a multi-speed transmission 20. Front driveline 12 includes a front differential 22 driven by powertrain 16 for transmitting drive torque to a pair of front wheels 24L and 24R through a pair of front axleshafts 26L and 26R, respectively. Rear driveline 14 includes a power transfer unit 28 driven by powertrain 16 or differential 22, a propshaft 30 driven by power transfer unit 28, a rear axle assembly 32 and a power transmission device 34 for selectively transferring drive torque from propshaft 30 to rear axle assembly 32. Rear axle assembly 32 is shown to include a rear differential 34, a pair of rear wheels 36L and 36R and a pair of rear axleshafts 38L and 38R that interconnect rear differential 34 to corresponding rear wheels 36L and 36R.

With continued reference to the drawings, drivetrain 10 is shown to further include an electronically-controlled power transfer system for permitting a vehicle operator to select a locked ("part-time") four-wheel drive mode, and an adaptive ("on-demand") four-wheel drive mode. In this regard, power transmission device 34 is equipped with a transfer clutch 50 that can be selectively actuated for transferring drive torque from propshaft 30 to rear axle assembly 32 for establishing the part-time and on-demand four-wheel drive modes. The power transfer system further includes a power-operated clutch actuator 52 for actuating transfer clutch 50, vehicle sensors 54 for detecting certain dynamic and operational characteristics of motor vehicle 10, a mode select mechanism 56 for permitting the vehicle operator to select one of the available drive modes, and a controller 58 for controlling actuation of clutch actuator 52 in response to input signals from vehicle sensors 54 and mode selector 56.

Figure 2:
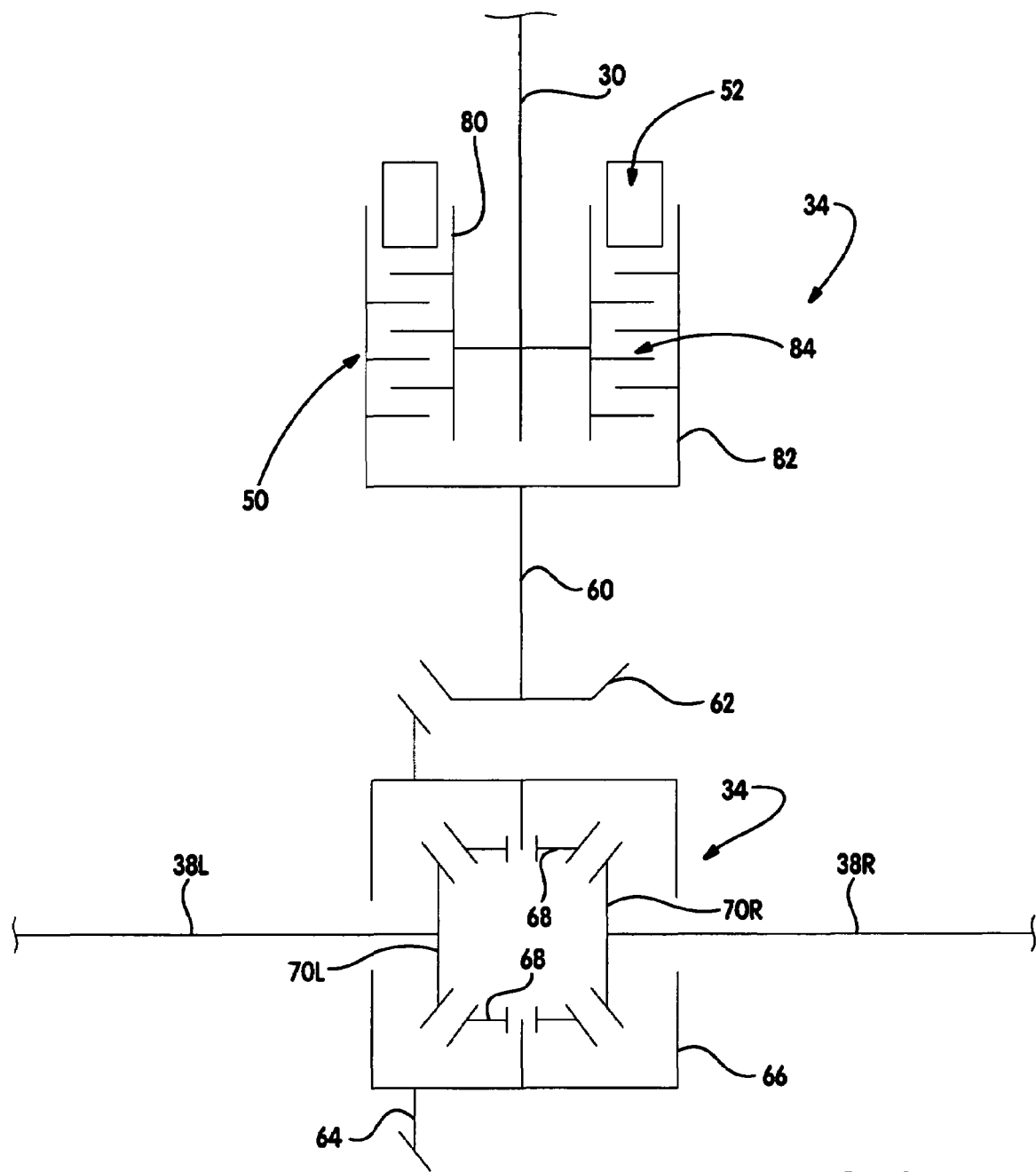
FIG. 2 is a schematic illustration of the power transmission device shown in FIG. 1 associated with a drive axle assembly.

Power transmission device, hereinafter referred to as torque coupling 34, is shown schematically in FIG. 2 to be operably disposed between propshaft 30 and a pinion shaft 60. As seen, pinion shaft 60 includes a pinion gear 62 that is meshed with a hypoid ring gear 64 that is fixed to a differential case 66 of rear differential 34. Differential 34 is conventional in that pinions 68 driven by case 66 are arranged to drive side gears 70L and 70R which are fixed for rotation with corresponding axleshafts 38L and 38R. Torque coupling 34 is shown to include transfer clutch 50 and clutch actuator 52 arranged to control the transfer of drive torque from propshaft 30 to pinion shaft 60 and which together define the torque transfer mechanism of the present invention.

Figure 3:
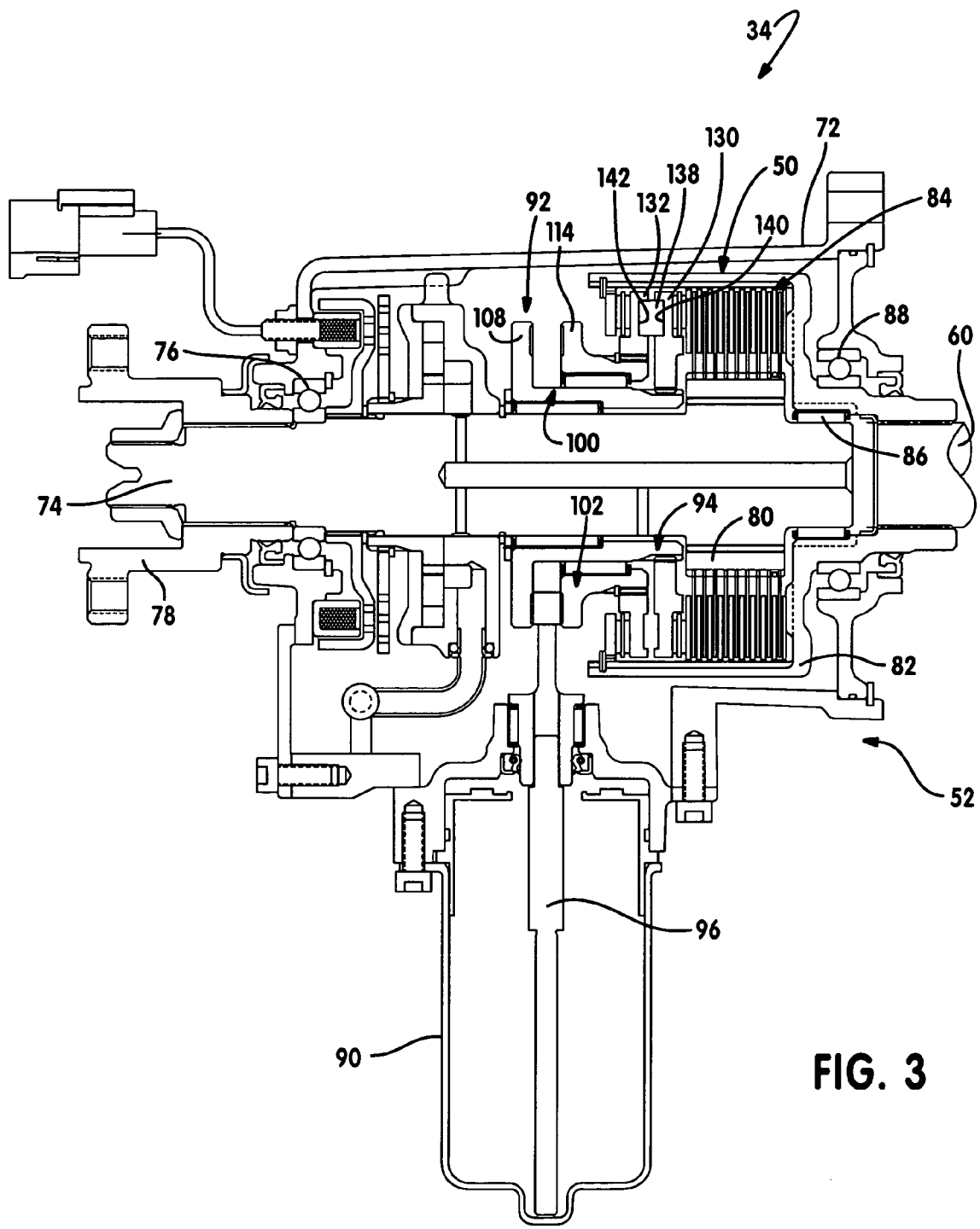
FIG. 3 is a sectional view of the power transmission device which is equipped with a torque transfer mechanism according to the present invention.
Figure 4:
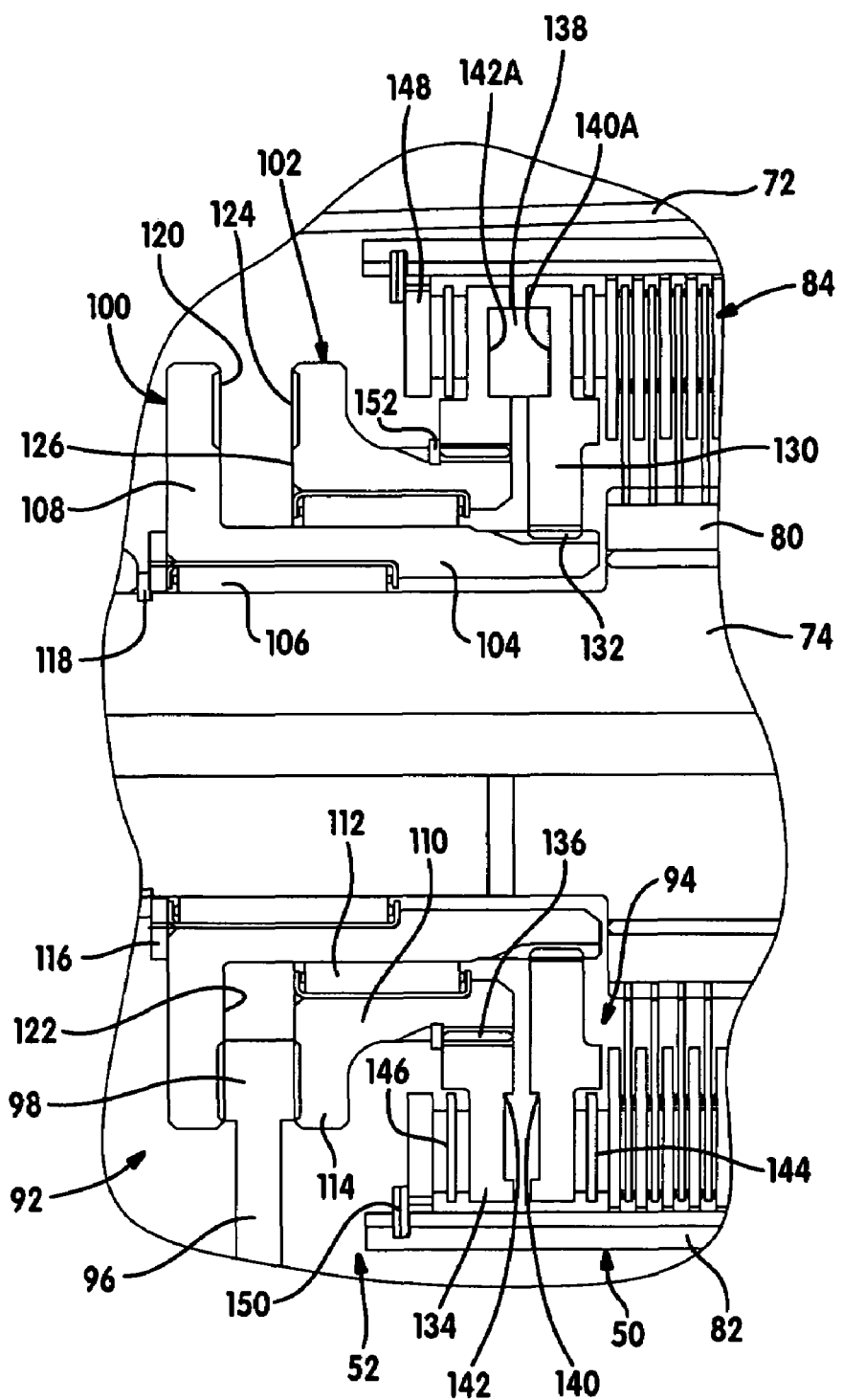
FIG. 4 is an enlarged partial view taken from FIG. 3.

Referring primarily to FIGS. 3 and 4, the components and function of torque coupling 34 will be disclosed in detail. As seen, torque coupling 34 generally includes a housing 72, an input shaft 74 rotatably supported in housing 72 via a bearing assembly 76, transfer clutch 50 and clutch actuator 52. A yoke 78 is fixed to a first end of input shaft 74 to permit connection with propshaft 30. Transfer clutch 50 includes a hub 80 fixed for rotation with input shaft 74, a drum 82 fixed for rotation with pinion shaft 60, and a multi-plate clutch pack 84 comprised of alternating inner and outer clutch plates that are disposed between hub 80 and drum 82. As shown, a bearing assembly 86 rotatably supports a second end of input shaft 74 in drum 82 which, in turn, is rotatably supported in housing 72 via a bearing assembly 88.

Clutch actuator assembly 52 is generally shown to include an electric motor 90, a geared drive unit 92 and a clutch apply operator 94. Electric motor 90 is secured to housing 72 and includes a rotary output shaft 96 having a drive gear 98. Geared drive unit 92 generally includes a first drive component 100 and a second drive component 102 that are supported for rotation relative to each other and input shaft 74. In particular, first drive component 100 includes a cylindrical first hub segment 104 rotatably supported via a bearing assembly 106 on input shaft 74 and a radially extending first ring segment 108 located at a first end of first hub segment 104. Second drive component 102 includes a cylindrical second hub segment 110 rotatably supported via a bearing assembly 112 on hub segment 104 and a radially extending second ring segment 114 located at a first end of second hub segment 110. A thrust plate 116 and a lock ring 118 are provided to axially position geared drive unit 92 on input shaft 74. As seen, first ring segment 108 includes first gear teeth 120 on its inner face surface 122 that are meshed with drive gear 98. Likewise, second ring segment 114 includes second gear teeth 124 on its outer face surface 126 that are also meshed with drive gear 98. Thus, rotation of drive gear 98 in a first direction results in a corresponding amount of relative rotation between first drive component 100 and second drive component 102 in a first direction. Furthermore, rotation of drive gear 98 in the opposite second direction results in a corresponding amount of relative rotation between first and second drive components 100 and 102 in a second direction. As will be detailed, this bi-directional control over the rotation of first drive component 100 relative to second drive component 102 is utilized to control accurate and quick engagement of clutch pack 84 through clutch apply operator 94.

Clutch apply operator 94 is best shown in FIG. 4 to include a first cam plate 130 fixed via a spline connection 132 to a second end of first hub segment 104, a second cam plate 134 fixed via a spline connection 136 to a second end of second hub segment 110, and rollers 138. A roller 138 is disposed in each of a plurality of aligned cam grooves 140 and 142 formed in corresponding facing surfaces of first and second cam plates 130 and 134, respectively. Preferably, three equally-spaced sets of such facing cam grooves 140 and 142 are formed in cam plates 130 and 134, respectively. Grooves 140 and 142 are formed to include cam surfaces 140A and 142A, respectively, that are ramped, tapered or otherwise contoured in a circumferential direction. Rollers 138 roll against cam surfaces 140A and 142A so as to cause axial movement of first cam plate 130 relative to second cam plate 134 in response to relative rotation therebetween. As seen, a first thrust bearing assembly 144 is disposed between first cam plate 130 and clutch pack 84 while a second thrust bearing assembly 146 is disposed between second cam plate 134 and a retainer plate 148 that is axially located on drum 88 via a lock ring 150. Another lock ring 152 is provided to axially restrain second cam plate 134 on second hub segment 110 of second drive component 102.

First cam plate 130 is axially moveable relative to clutch pack 84 between a first or "released" position and a second or "locked" position. With first cam plate 130 in its released position, a minimum clutch engagement force is exerted on clutch pack 84 such that virtually no drive torque is transferred from input shaft 74 through clutch pack 84 to pinion shaft 60 so as to establish a two-wheel drive mode. In contrast, location of first cam plate 130 in its locked position causes a maximum clutch engagement force to be applied to clutch pack 84 such that pinion shaft 60 is, in effect, coupled for common rotation with input shaft 74 so as to establish a "locked or part-time" four-wheel drive mode. Therefore, accurate bi-directional control of the axial position of first cam plate 130 between its released and locked positions permits adaptive regulation of the amount of drive torque transferred from input shaft 74 to pinion shaft 60, thereby establishing the on-demand four-wheel drive mode.

The tapered contour of cam surfaces 140A and 142A is selected to control the axial translation of first cam plate 130 relative to clutch pack 84 from its released position to its locked position in response to drive gear 98 being driven by motor 90 in a first rotary direction. Such rotation of drive gear 98 in a first direction causes first drive component 100 to be angularly driven in a direction opposite to that of second drive component 102, thereby causing a corresponding amount of relative rotation between cam plates 130 and 134 such that rollers 138 ride against contoured cam surfaces 140A and 142A. However, since second cam plate 134 is restrained against axial movement, the relative rotation causes axial movement of first cam plate 130 to its locked position for applying the maximum clutch engagement force on clutch pack 84. Likewise, first cam plate 130 is axially translated from its locked position back to its released position in response to drive gear 98 being rotated in a second direction through the same amount of angular travel. Such rotation of drive gear 98 in the second direction is caused by electric motor 90 driving motor shaft 96 in a second rotary direction.

The amount of angular movement of drive components 100 and 102 in opposite directions (i.e., the amount of relative rotation) and the corresponding amount of axial travel of first cam plate 130 can be selected to meet the particular clutch requirements. Likewise, the profile of cam surfaces 140A and 140B are selected to provide amplification of the clutch engagement forces. As an alternative to the arrangement shown, one of cam surfaces 140A and 142A can be non-tapered such that the ramping profile is configured entirely within the other of the cam surfaces. Also, rollers 138 are shown be cylindrical but are contemplated to permit use of ball rollers disposed in semi-spherical cam grooves.

In operation, when mode selector 56 indicates selection of a two-wheel drive mode, controller 58 signals electric motor 90 to rotate motor shaft 96 in the second direction for moving first cam plate 130 until it is located in its released position, thereby releasing clutch pack 84. If mode selector 56 thereafter indicates selection of the part-time four-wheel drive mode, electric motor 90 is signaled by controller 58 to rotate driveshaft 96 in the first direction for causing linear translation of first cam plate 130 until it is located in its locked position. As noted, such movement of first cam plate 130 to its locked position acts to fully engage clutch pack 84, thereby coupling pinion shaft 60 to input shaft 74.

When mode selector 56 indicates selection of the on-demand four-wheel drive mode, controller 58 energizes motor 90 to rotate driveshaft 96 until first cam plate 130 is located in a ready or "stand-by" position. This position may be its released position or, in the alternative, an intermediate position. In either case, a predetermined minimum amount of drive torque is delivered to pinion shaft 60 through clutch pack 84 in this stand-by condition. Thereafter, controller 58 determines when and how much drive torque needs to be transferred to pinion shaft 60 based on current tractive conditions and/or operating characteristics of the motor vehicle, as detected by sensors 54. As will be appreciated, any control schemes known in the art can be used with the present invention for adaptively controlling actuation of transfer clutch 50 in a driveline application. The arrangement described for clutch actuator 52 is an improvement over the prior art in that the torque amplification provided by geared drive unit 92 permits use of a small low-power electric motor and yet provides extremely quick response and precise control over the position of first cam plate 130 and thus the magnitude of the clutch engagement force applied to clutch pack 84.

Figure 5:
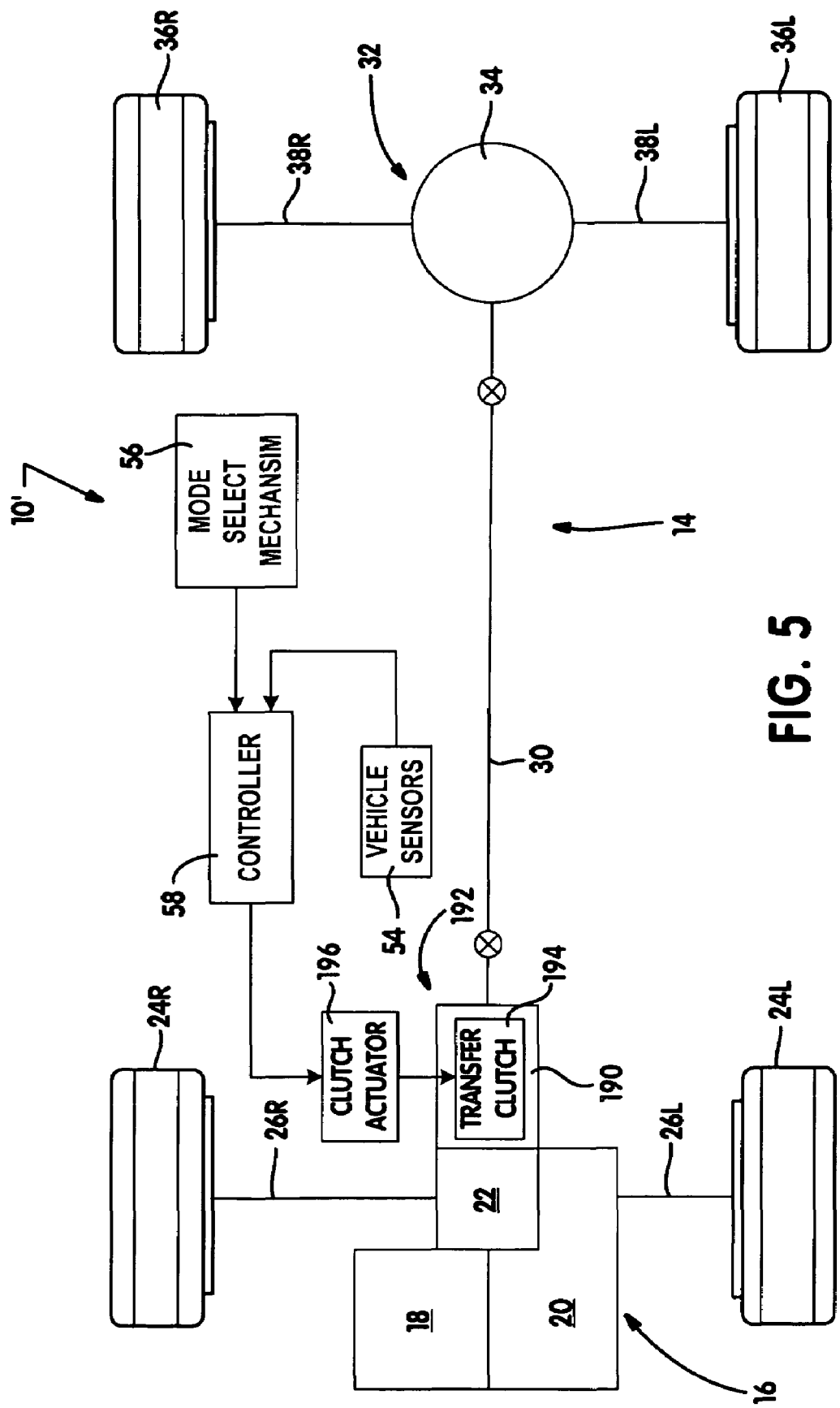
FIGS. 5–8 are schematic illustrations of alternative embodiments for the power transmission device of the present invention.

To illustrate an alternative power transmission device to which the present invention is applicable, FIG. 5 schematically depicts a front-wheel based four-wheel drivetrain layout 10' for a motor vehicle. In particular, engine 18 drives multi-speed transmission 20 having an integrated front differential unit 22 for driving front wheels 24L and 24R via axleshafts 26L and 26R. A power transfer unit 190 is also driven by powertrain 16 for delivering drive torque to the input member of a torque transfer coupling 192 that is operable for selectively transferring drive torque to propshaft 30. Accordingly, when sensors indicate the occurrence of a front wheel slip condition, controller 58 adaptively controls actuation of torque coupling 192 such that drive torque is delivered "on-demand" to rear driveline 14 for driving rear wheels 36L and 36R. It is contemplated that torque transfer coupling 192 would include a multi-plate clutch assembly 194 and a clutch actuator 196 that are generally similar in structure and function to multi-plate clutch assembly 50 and clutch actuator 52 previously described herein.

Figure 6:
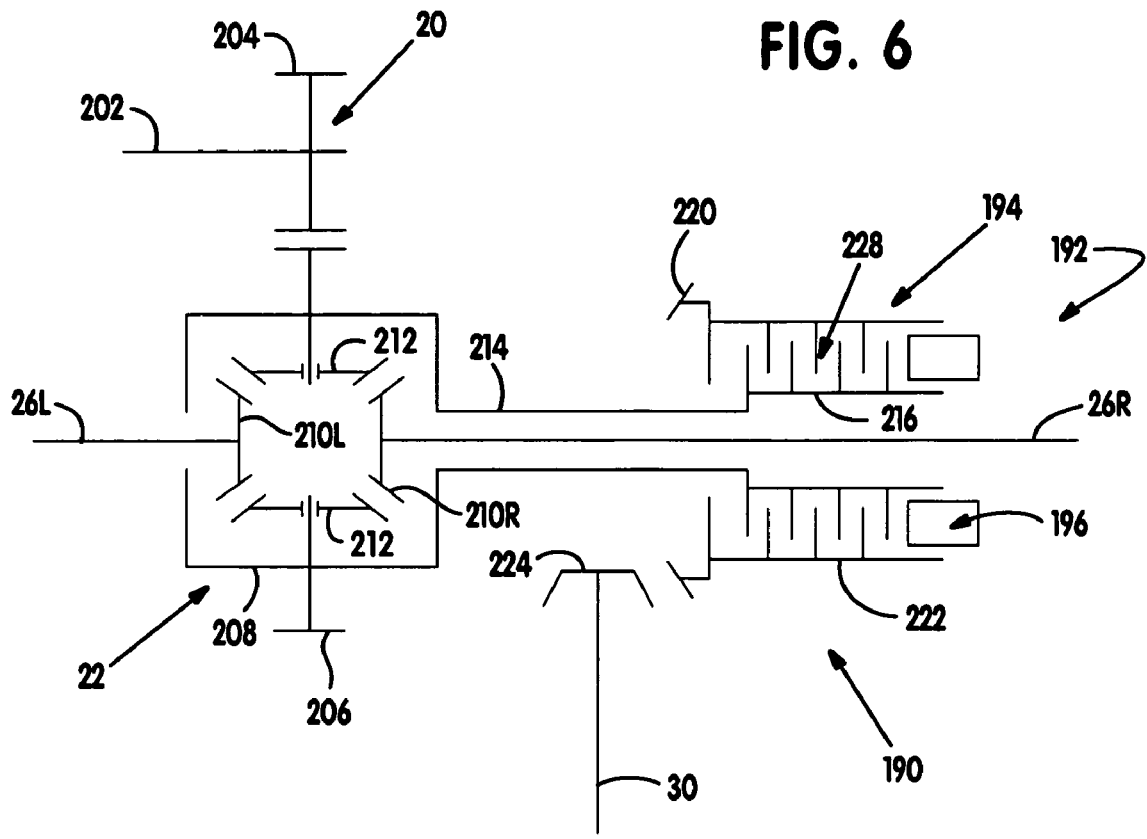

Referring now to FIG. 6, power transfer unit 190 is now schematically illustrated in association with an on-demand all-wheel drive system based on a front-wheel drive vehicle similar to that shown in FIG. 5. In particular, an output shaft 202 of transmission 20 is shown to drive an output gear 204 which, in turn, drives an input gear 206 fixed to a carrier 208 associated with front differential unit 22. To provide drive torque to front wheels 24L and 24R, front differential 22 further includes a pair of side gears 210L and 210R that are connected to the front wheels via corresponding axleshafts 26L and 26R. Differential unit 22 also includes pinions 212 that are rotatably supported on pinion shafts fixed to carrier 208 and which are meshed with both side gears 210L and 210R. A transfer shaft 214 is provided to transfer drive torque from carrier 208 to torque coupling 192.

Power transfer unit 190 includes a right-angled drive mechanism having a ring gear 220 fixed for rotation with a drum 222 of clutch assembly 194 and which is meshed with a pinion gear 224 fixed for rotation with propshaft 30. As seen, a clutch hub 216 of clutch assembly 194 is driven by transfer shaft 214 while a clutch pack 228 is disposed between hub 216 and drum 222. Clutch actuator assembly 196 is operable for controlling engagement of clutch assembly 194. Clutch actuator assembly 196 is intended to be similar to motor-driven clutch actuator assembly 52 previously described in that an electric motor is supplied with electric current for controlling relative rotation of a geared drive unit which, in turn, controls translational movement of a cam plate operator for controlling engagement of a clutch pack 228.

In operation, drive torque is transferred from the primary (i.e., front) driveline to the secondary (i.e., rear) driveline in accordance with the particular mode selected by the vehicle operator via mode selector 56. For example, if the on-demand four-wheel drive mode is selected, controller 58 modulates actuation of clutch actuator assembly 196 in response to the vehicle operating conditions detected by sensors 54 by varying the value of the electric control signal sent to the motor. In this manner, the level of clutch engagement and the amount of drive torque that is transferred through clutch pack 228 to rear driveline 14 through power transfer unit 190 is adaptively controlled. Selection of the part-time four-wheel drive mode results in full engagement of clutch assembly 194 for rigidly coupling the front driveline to the rear driveline. In some applications, mode selector 56 may be eliminated such that only the on-demand four-wheel drive mode is available so as to continuously provide adaptive traction control without input from the vehicle operator.

Figure 7:
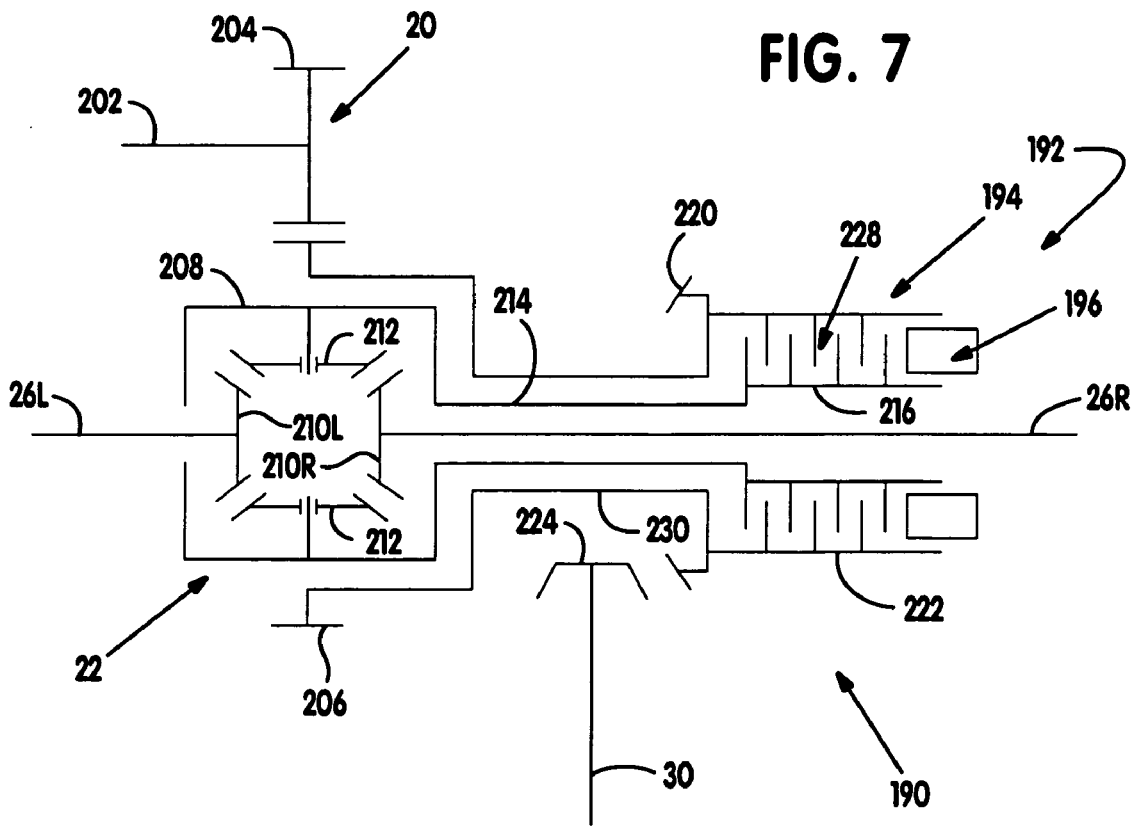

FIG. 7 illustrates a modified version of FIG. 6 wherein an on-demand four-wheel drive system is shown based on a rear-wheel drive motor vehicle that is arranged to normally deliver drive torque to rear driveline 14 while selectively transmitting drive torque to front wheels 24L and 24R through torque coupling 192. In this arrangement, drive torque is transmitted directly from transmission output shaft 202 to transfer unit 190 via a drive shaft 230 interconnecting input gear 206 to ring gear 220. To provide drive torque to the front wheels, torque coupling 192 is shown operably disposed between drive shaft 230 and transfer shaft 214. In particular, clutch assembly 194 is arranged such that drum 222 is driven with ring gear 220 by drive shaft 230. As such, actuation of clutch actuator 196 functions to transfer torque from drum 222 through clutch pack 228 to hub 216 which, in turn, drives carrier 208 of front differential unit 22 via transfer shaft 214. Again, the vehicle could be equipped with mode selector 56 to permit selection by the vehicle operator of either the adaptively controlled on-demand four-wheel drive mode or the locked part-time four-wheel drive mode. In vehicles without mode selector 56, the on-demand four-wheel drive mode is the only drive mode available and provides continuous adaptive traction control without input from the vehicle operator.

Figure 8:
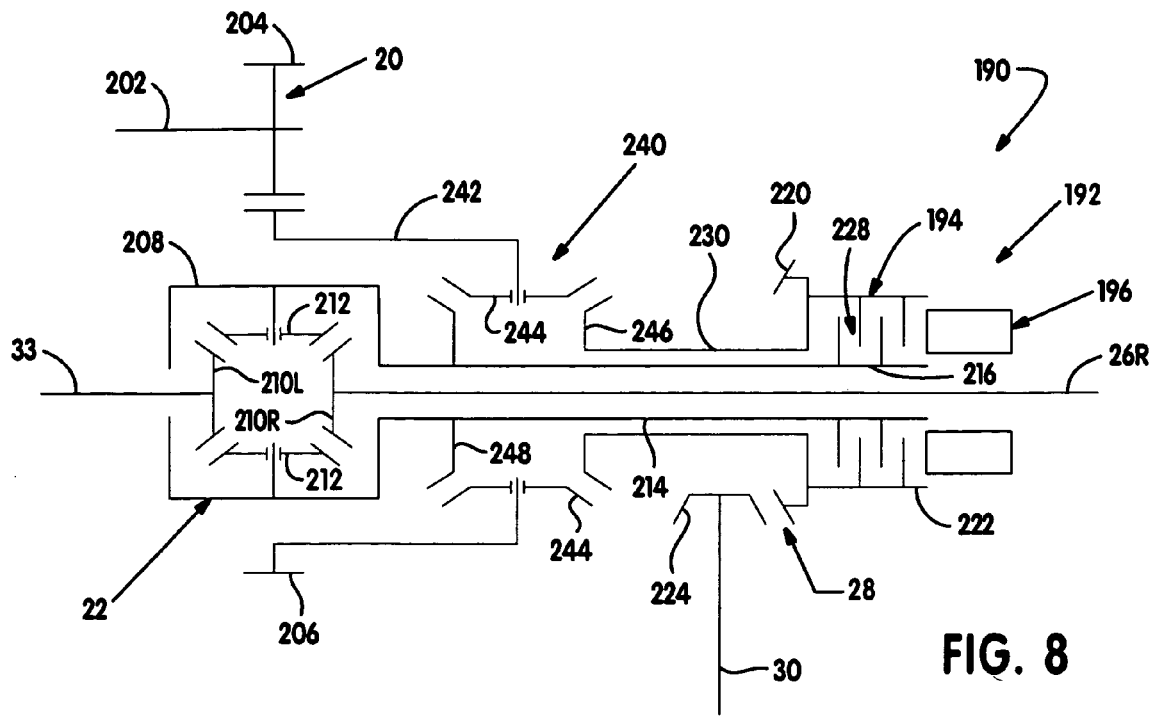

In addition to the on-demand 4WD systems shown previously, the power transmission technology of the present invention can likewise be used in full-time 4WD systems to adaptively bias the torque distribution transmitted by a center or "interaxle" differential unit to the front and rear drivelines. For example, FIG. 8 schematically illustrates a full-time four-wheel drive system which is generally similar to the on-demand four-wheel drive system shown in FIG. 7 with the exception that power transfer unit 190 now includes an interaxle differential unit 240 that is operably installed between carrier 208 of front differential unit 22 and transfer shaft 214. In particular, output gear 206 is fixed for rotation with a carrier 242 of interaxle differential 240 from which pinion gears 244 are rotatably supported. A first side gear 246 is meshed with pinion gears 244 and is fixed for rotation with drive shaft 230 so as to be drivingly interconnected to rear driveline 14 through gearset 220 and 224. Likewise, a second side gear 248 is meshed with pinion gears 244 and is fixed for rotation with carrier 208 of front differential unit 22 so as to be drivingly interconnected to the front driveline. Torque transfer mechanism 192 is now shown to be operably disposed between side gears 246 and 248. As such, torque transfer mechanism 192 is operably arranged between the driven outputs of interaxle differential 240 for providing a torque biasing and slip limiting function. Torque transfer mechanism 192 is shown to again include multi-plate clutch assembly 194 and clutch actuator assembly 196. Clutch assembly 194 is operably arranged between transfer shaft 214 and driveshaft 230. In operation, when sensor 54 detects a vehicle operating condition, such as excessive interaxle slip, controller 58 adaptively controls activation of the electric motor associated with clutch actuator assembly 196 for controlling engagement of clutch assembly 194 and thus the torque biasing between the front and rear drivelines.

Figure 9:
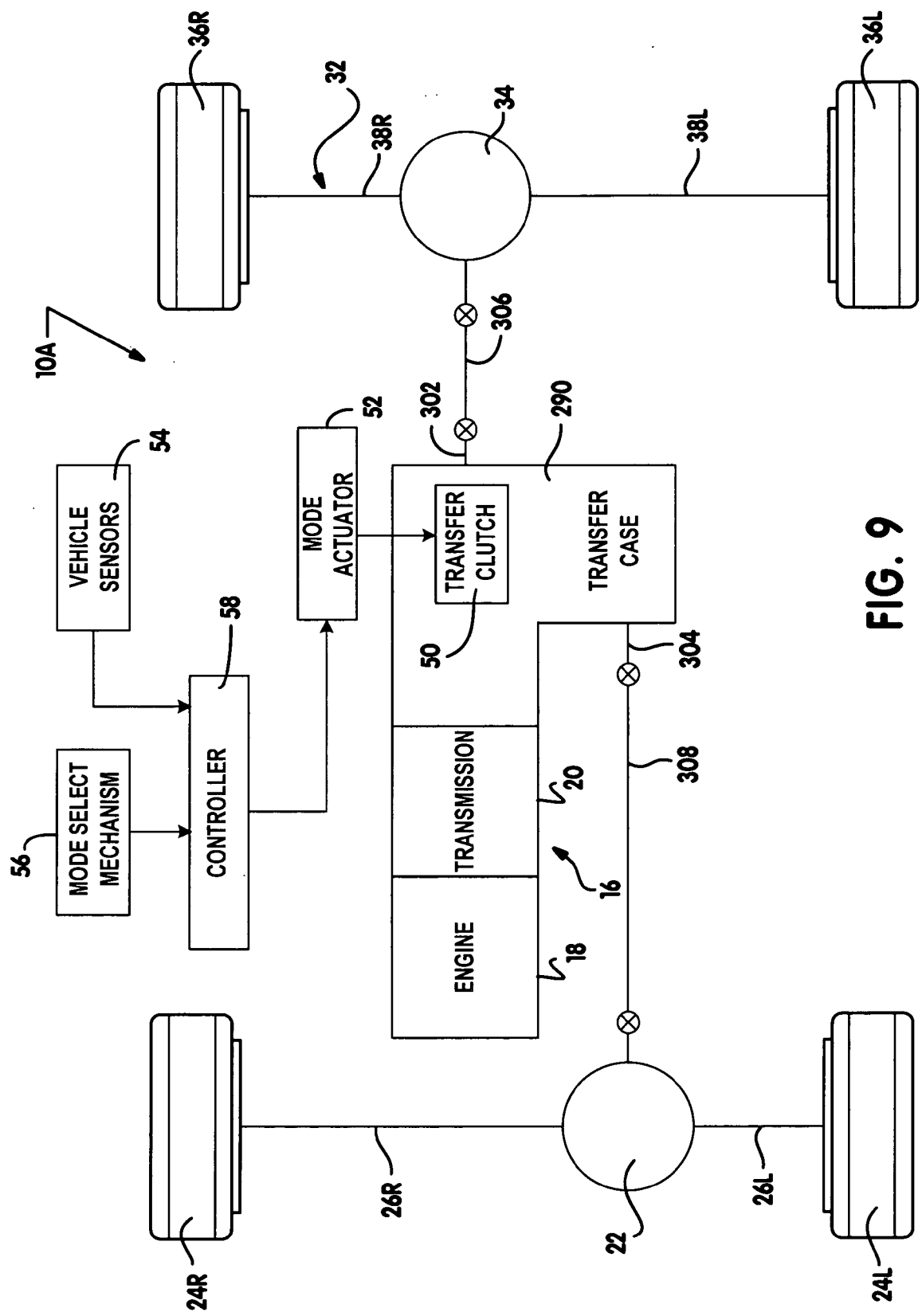
FIG. 9 illustrates the drivetrain of a four-wheel drive vehicle equipped with another version of the power transmission device of the present invention.

Referring now to FIG. 9, a schematic layout of a drivetrain 10A for a four-wheel drive vehicle having powertrain 16 delivering drive torque to a power transfer unit, hereinafter referred to as transfer case 290. Transfer case 290 includes a rear output shaft 302, a front output shaft 304 and a torque coupling 292 therebetween. Torque coupling 292 generally includes a multi-plate clutch assembly 294 and a power-operated clutch actuator 296. As seen, a rear propshaft 306 couples rear output shaft 302 to rear differential 34 while a front propshaft 308 couples front output shaft 304 to front differential 22. Power-operated clutch actuator 294 is again schematically shown to provide adaptive control over engagement of a clutch assembly 294 incorporated into transfer case 290.

Figure 10:
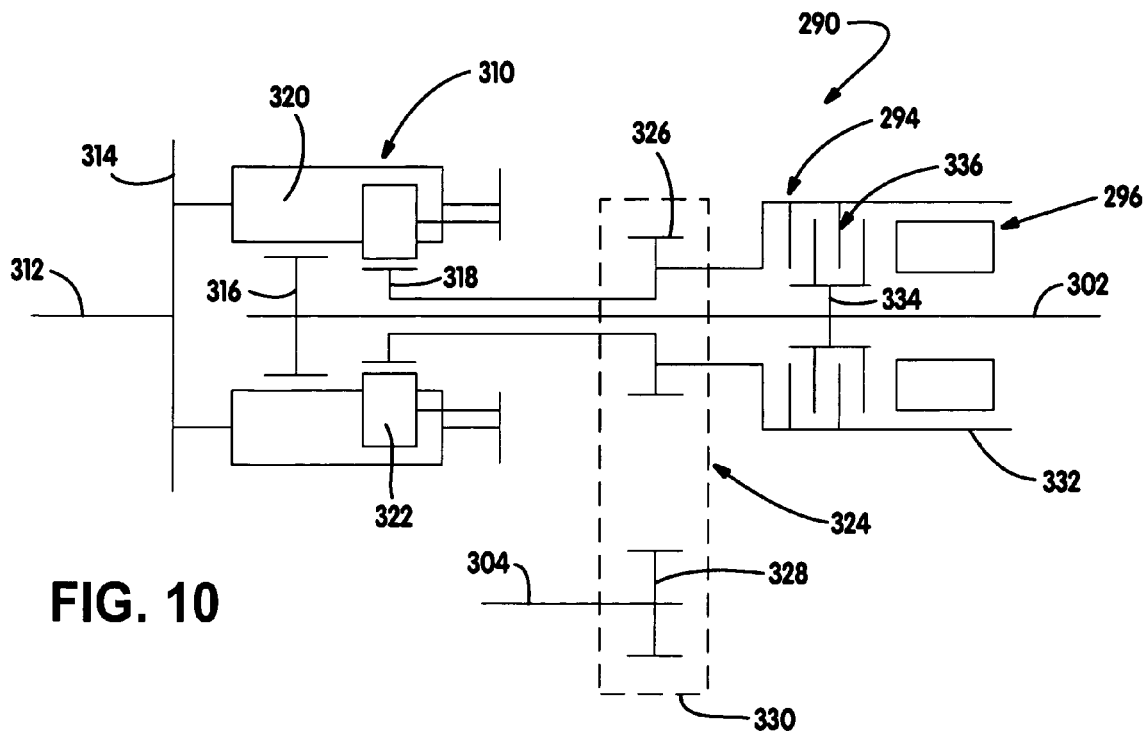
FIGS. 10 and 11 are schematic illustrations of transfer cases adapted for use with the drivetrain shown in FIG. 9.

Referring now to FIG. 10, a full-time 4WD system is shown to include transfer case 290 equipped with an inter-axle differential 310 between an input shaft 312 and output shafts 302 and 304. Differential 310 includes an input defined as a planet carrier 314, a first output defined as a first sun gear 316, a second output defined as a second sun gear 318, and a gearset for permitting speed differentiation between first and second sun gears 316 and 318. The gearset includes meshed pairs of first planet gears 320 and second planet gears 322 which are rotatably supported by carrier 314. First planet gears 320 are shown to mesh with first sun gear 316 while second planet gears 322 are meshed with second sun gear 318. First sun gear 316 is fixed for rotation with rear output shaft 302 so as to transmit drive torque to the rear driveline. To transmit drive torque to the front driveline, second sun gear 318 is coupled to a transfer assembly 324 which includes a first sprocket 326 rotatably supported on rear output shaft 302, a second sprocket 328 fixed to front output shaft 304, and a power chain 330.

Figure 11:
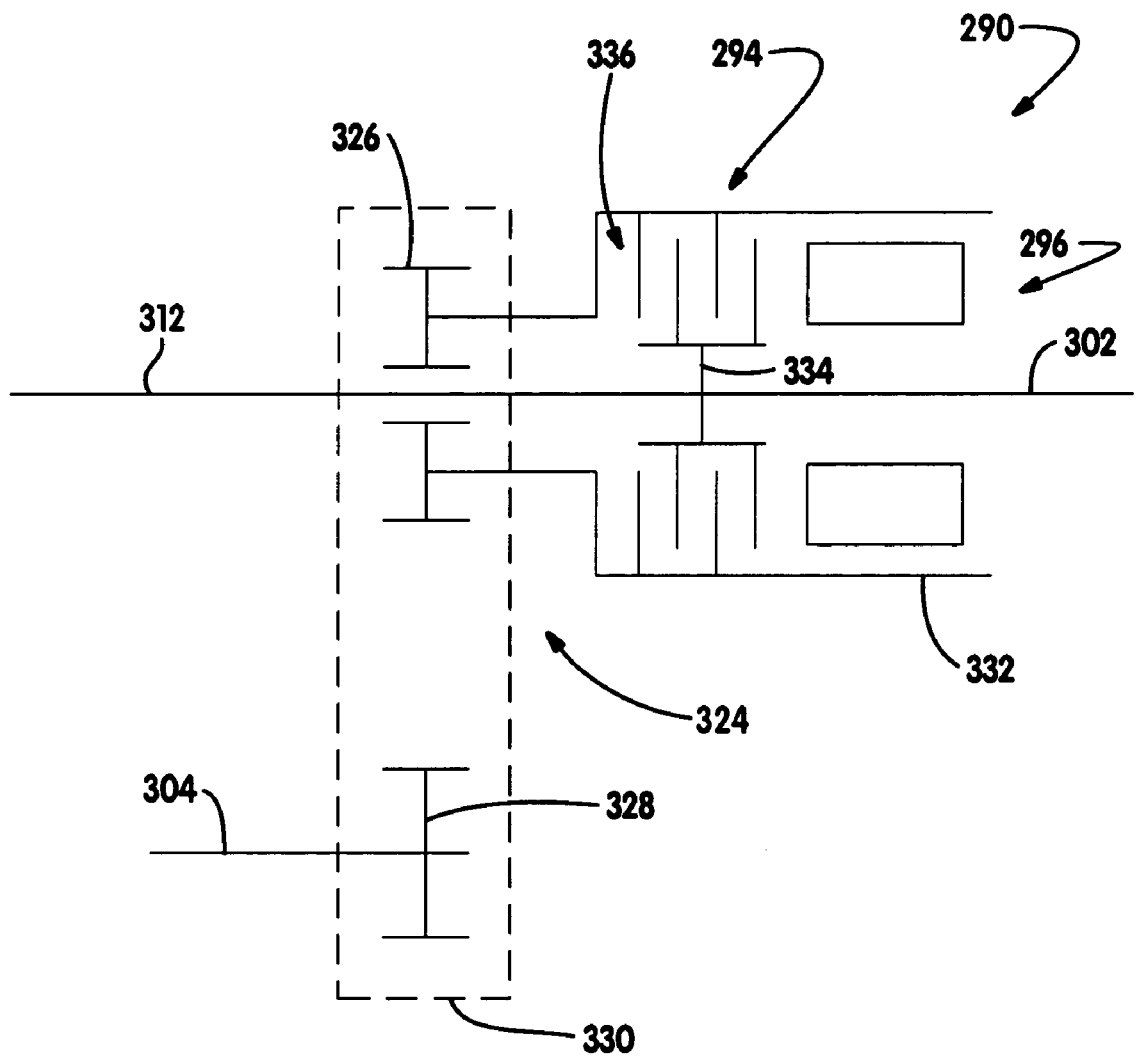

As noted, transfer case 290 includes clutch assembly 294 and clutch actuator 296. Clutch assembly 294 has a drum 332 fixed to sprocket 326 for rotation with front output shaft 304, a hub 334 fixed for rotation with rear output shaft 302 and a multi-plate clutch pack 336 therebetween. Again, clutch actuator 296 is schematically shown but intended to be substantially similar in structure and function to that disclosed in association with clutch actuator 52 shown in FIGS. 3 and 4. FIG. 11 is merely a modified version of transfer case 290 which is constructed without center differential 310 to provide an on-demand four-wheel drive system.

Figure 12:
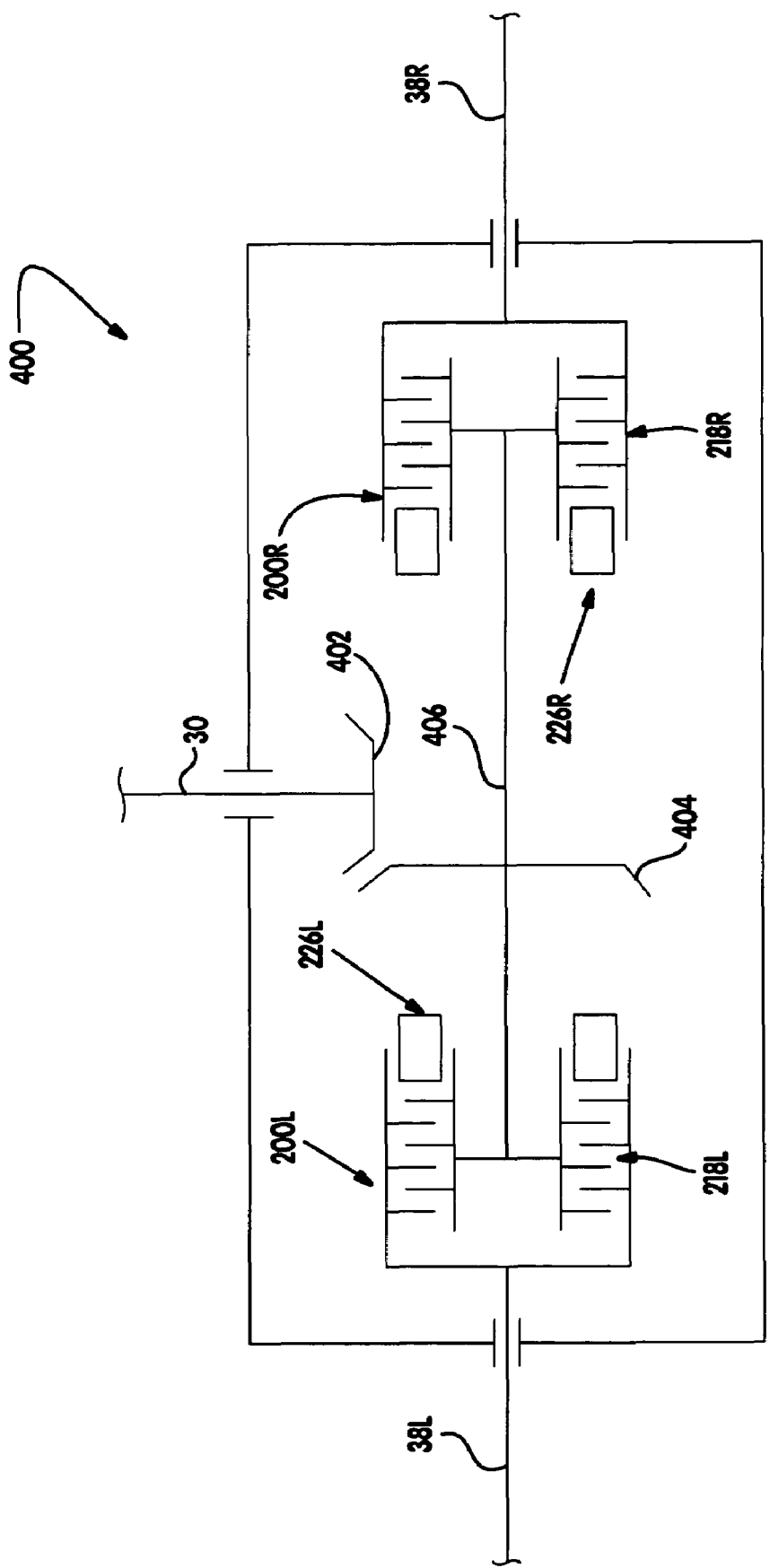
FIG. 12 is a schematic view of a power transmission device equipped with a torque vectoring distribution mechanism according to the present invention.

Referring now to FIG. 12, a drive axle assembly 400 is schematically shown to include a pair of torque couplings operably installed between driven propshaft 30 and rear axleshafts 38L and 38R. Propshaft 30 drives a right-angle gearset including pinion 402 and ring gear 404 which, in turn, drives a transfer shaft 406. A first torque coupling 200L is shown disposed between transfer shaft 406 and left axieshaft 38L while a second torque coupling 200R is disposed between transfer shaft 406 and right axleshaft 38R. Each of the torque couplings can be independently controlled via activation of its corresponding clutch actuator assembly 226L, 226R to adaptively control side-to-side torque delivery. In a preferred application, axle assembly 400 can be used in association with the secondary driveline in four-wheel drive motor vehicles.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transmission device comprising:
    a rotary input member adapted to receive drive torque from a power source;
    a rotary output member adapted to provide drive torque to an output device;
    a torque transfer mechanism operable for transferring drive torque from said input member to said output member, said torque transfer mechanism including a clutch assembly operably disposed between said input member and said output member and a clutch actuator assembly for applying a clutch engagement force to said clutch assembly, said clutch actuator assembly including an electric motor driving a geared drive unit for controlling said clutch engagement force applied to said clutch assembly by a clutch apply operator, said geared drive unit includes a drive gear driven by said electric motor and first and second face gears with said drive gear in meshed engagement therebetween so as to cause said first and second face gears to rotate in opposite directions in response to driven rotation of said drive gear, said clutch apply operator including a first cam plate fixed for rotation with said first face gear, a second cam plate fixed for rotation with said second face gear and rollers disposed between said first and second cam plates; and
    a control system for actuating said electric motor so as to control the direction and amount of opposite rotary movement between said first and second face gears which, in turn, controls the direction and amount of translational movement of said first cam plate relative to said clutch assembly so as to vary the clutch engagement force exerted on said clutch assembly.

2. The power transmission device of claim 1 wherein said first face gear includes a first hub segment rotatably supported on said input member and a first ring segment having first gear teeth formed on a first face surface, wherein said second face gear includes a second hub segment rotatably supported on said first hub segment and a second ring segment having second gear teeth formed on a second face surface, and wherein said drive gear is meshed with said first and second gear teeth.

3. The power transmission device of claim 2 wherein said first cam plate is fixed for rotation with said first hub segment of said first face gear, wherein said second cam plate is fixed for rotation with said second hub segment of said second face gear, and wherein said rollers are disposed to roll against cam surfaces formed on at least one of said first and second cam plates.

4. The power transmission device of claim 2 wherein said drive gear is fixed to a shaft driven by said electric motor with said drive gear located between said first and second face surfaces of said first and second face gears, respectively.

5. The power transmission device of claim 2 wherein said clutch assembly includes a hub fixed to one of said input and output members, a drum fixed to the other of said input and output members, a clutch pack disposed within said drum and operably connected between said hub and drum, and wherein said first and second cam plates are disposed within said drum.

6. The power transmission device of claim 1 wherein said first face gear is rotatable relative to said second face gear between a first position and a second position in response to activation of said electric motor for causing corresponding axial movement of said first cam plate between a retracted position and an extended position relative to said clutch assembly, said first cam plate exerting a minimum clutch engagement force on said clutch assembly when said cam member is located in its retracted position and exerting a maximum clutch engagement force on said clutch assembly when located in its extended position.

7. The power transmission device of claim 6 wherein said input member provides drive torque to a first driveline of a motor vehicle, wherein said output member is coupled to a second driveline of the motor vehicle, and wherein said torque transfer mechanism is operable to transfer drive torque from said input member to said output member.

8. The power transmission device of claim 7 defining a transfer case wherein said input member is a first shaft driving the first driveline and said output member is a second shaft coupled to the second driveline, wherein location of said first cam plate in its retracted position releases engagement of said clutch assembly so as to define a two-wheel drive mode and location of said first cam plate in its extended position fully engages said clutch assembly so as to define a part-time four-wheel drive mode, and wherein said control system is operable to control activation of said electric motor for varying the position of said first cam plate between its retracted and extended positions to controllably vary the drive torque transferred from said first shaft to said second shaft so as to define an on-demand four-wheel drive mode.

9. The power transmission device of claim 8 wherein said control system includes a controller for receiving input signals from a sensor and generating electric control signals based on said input signals which are supplied to said electric motor for controlling the direction and amount of rotary movement of said drive gear.

10. The power transmission device of claim 7 defining a power take-off unit wherein said input member provides drive torque to a first differential associated with the first driveline, and wherein said output member is coupled to a second differential associated with the second driveline.

11. The power transmission device of claim 1 wherein said input member is a propshaft driven by a drivetrain of a motor vehicle and said output member is a pinion shaft driving a differential associated with an axle assembly of the motor vehicle, and wherein said clutch assembly is disposed between said propshaft and said pinion shaft such that actuation of said clutch actuator assembly is operable to transfer drive torque from said propshaft to said pinion shaft.

12. The power transmission device of claim 1 wherein said input member includes a first differential supplying drive torque to a pair of first wheels in a motor vehicle and a transfer shaft driven by said differential, said output member includes a propshaft coupled to a second differential interconnecting a pair of second wheels in the motor vehicle, and wherein said clutch assembly is disposed between said transfer shaft and said propshaft.

13. The power transmission device of claim 1 wherein said input member includes a first shaft supplying drive torque to a second shaft which is coupled to a first differential for driving a pair of first wheels in a motor vehicle, said output member is a third shaft driving a second differential interconnecting a pair of second wheels of the motor vehicle, and wherein said clutch assembly is operably disposed between said first and third shafts.

14. The power transmission device of claim 1 further including an interaxle differential driven by said input member and having a first output driving a first driveline in a motor vehicle and a second output driving a second driveline in the motor vehicle, and wherein said clutch assembly is operably disposed between said first and second outputs of said interaxle differential.

15. A torque transfer mechanism for transferring drive torque from a rotary input member to a rotary output member, comprising:
a friction clutch assembly having a drum fixed for rotation with one of the input member and the output member, a hub fixed for rotation with the other of the input member and the output member, a clutch pack operably disposed between said drum and said hub, and a pressure plate moveable between a first position whereat a minimum clutch engagement force is exerted on said clutch pack and a second position whereat a maximum clutch engagement force is exerted on said clutch pack;
a clutch actuator assembly for moving said pressure plate between its first and second positions and including an electric motor driving a geared drive unit for controlling movement of a clutch apply operator, said geared drive unit includes a drive gear driven by said electric motor and first and second face gears with said drive gear in meshed engagement therebetween so as to cause said first and second face gears to rotate in opposite directions in response to driven rotation of said drive gear, said clutch apply operator including a first cam plate fixed for rotation with said first face gear, a second cam plate fixed for rotation with said second face gear and rollers disposed between said first and second cam plates; and
a control system for actuating said electric motor so as to control rotary movement of said first face gear relative to said second face gear between a first position and a second position, said first cam plate being located in a first axial position when said first face gear is in its first position so as to cause said pressure plate to be located in its first position, and said first cam plate is located in a second axial position when said first face gear is rotated to its second position so as to cause said pressure plate to move to its second position.

16. The torque transfer mechanism of claim 15 wherein said first face gear includes a first hub segment rotatably supported on the input member and a first ring segment having first gear teeth formed on a first face surface, wherein said second face gear includes a second hub segment rotatably supported on said first hub segment and a second ring segment having second gear teeth formed on a second face surface, and wherein said drive gear is meshed with said first and second gear teeth.

17. The torque transfer mechanism of claim 16 wherein said first cam plate is fixed for rotation with said first hub segment of said first face gear, wherein said second cam plate is fixed for rotation with said second hub segment of said second face gear, and wherein said rollers are disposed to roll against cam surfaces formed on at least one of said first and second cam plates.

18. The torque transfer mechanism of claim 16 wherein said drive gear is fixed to a shaft driven by said electric motor with said drive gear located between said first and second face surfaces of said first and second face gears, respectively.

19. The torque transfer mechanism of claim 15 wherein the input member provides drive torque to a first driveline of a motor vehicle and the output member is coupled to a second driveline of the motor vehicle.

20. The torque transfer mechanism of claim 19 defining a transfer case wherein said input member is a first shaft driving the first driveline and the output member is a second shaft coupled to the second driveline, wherein location of said first cam plate in its first position releases engagement of said clutch assembly so as to define a two-wheel drive mode and location of said first cam plate in its second position fully engages said clutch assembly so as to define a part-time four-wheel drive mode, and wherein said control system is operable to control activation of said electric motor for varying the position of said first cam plate between its first and second positions to controllably vary the drive torque transferred from said first shaft to said second shaft so as to define an on-demand four-wheel drive mode.

21. The torque transfer mechanism of claim 20 wherein said control system includes a controller for receiving input signals from a sensor and generating electric control signals based on said input signals which are supplied to said electric motor for controlling the direction and amount of rotary movement of said drive gear.

22. The torque transfer mechanism of claim 19 defining a power take-off unit wherein the input member provides drive torque to a first differential associated with the first driveline, and wherein the output member is coupled to a second differential associated with the second driveline.

23. The torque transfer mechanism of claim 15 wherein the input member is a propshaft driven by a drivetrain of a motor vehicle and the output member is a pinion shaft driving a differential associated with an axle assembly of the motor vehicle, and wherein said clutch assembly is disposed between said propshaft and said pinion shaft such that actuation of said clutch actuator assembly is operable to transfer drive torque from said propshaft to said pinion shaft.

24. The torque transfer mechanism of claim 15 wherein the input member includes a first differential supplying drive torque to a pair of first wheels in a motor vehicle, and a transfer shaft driven by said first differential, the output member includes a propshaft coupled to a second differential interconnecting a pair of second wheels in the motor vehicle, and wherein said clutch assembly is disposed between said transfer shaft and said propshaft.

25. The power transmission device of claim 15 wherein the input member includes a first shaft supplying drive torque to a second shaft which is coupled to a first differential for driving a pair of first wheels in a motor vehicle and the output member is a third shaft driving a second differential interconnecting a pair of second wheels of the motor vehicle, and wherein said clutch assembly is operably disposed between said first and third shafts.

* * * * *